United States Patent [19]
Bouchard et al.

[11] 3,882,449
[45] May 6, 1975

[54] VEHICLE AUTOMATIC EMERGENCY SIGNALLING SYSTEM

[76] Inventors: Cyrille Bouchard; Roland Bouchard, both of Rang 9, St. Honore, Quebec, Canada

[22] Filed: Oct. 4, 1973

[21] Appl. No.: 403,680

[52] U.S. Cl.......... 340/52 H; 340/262; 200/61.45 R
[51] Int. Cl............................................. B60q 1/44
[58] Field of Search.................. 340/52 H, 65, 262; 200/61.45 R, 61.52

[56] References Cited
UNITED STATES PATENTS

| | | | |
|---|---|---|---|
| 2,992,418 | 7/1961 | McNiel | 340/262 |
| 3,431,556 | 3/1969 | Johnson | 340/262 X |
| 3,501,742 | 3/1970 | Ellison | 340/262 X |
| 3,699,515 | 10/1972 | Barnett | 340/65 |

*Primary Examiner*—Alvin H. Waring

[57] ABSTRACT

A vehicle emergency signalling system in which blinking lights mounted on the vehicle operate for a short period of time, such as one minute, upon emergency braking of the vehicle, and operate until manually cut off whenever the vehicle is involved in a collision, thereby producing a warning for following vehicles enabling the drivers of these vehicles to immediately take emergency procedures to avoid collision. The system includes an inertia switch and a timing device. The inertia switch closes its contacts upon deceleration of the vehicle above a certain rate and a timing device allows opening of the contacts after a certain delay from switch closing. The system includes manually-operated control means located in the passenger compartment of the vehicle to keep constant the time delay independently of the degree of slipperiness of the roadway and also to manually close or open the switch. The time delay system can be a well known clock work mechanism or a hydraulic system, although other types of time delay means can be used.

13 Claims, 9 Drawing Figures

VEHICLE AUTOMATIC EMERGENCY SIGNALLING SYSTEM

The present invention relates to a vehicle emergency signalling system and has for its general object such a system including blinking lights mounted on the vehicle and an inertia switch electrically connected to the blinking lights and mounted on the vehicle and operative upon deceleration of the motor vehicle above a certain rate to actuate the blinking lights for a certain period of time to warn following drivers of emergency stopping.

Another object of the invention is to provide a system of the character described, further including means to maintain the blinking lights in constant operation upon sudden stopping of the vehicle, such as in a collision, until manually released or cut off.

Another important object of the present invention is to provide manually-adjustable means to maintain the blinking lights in operation for a substantially equal duration despite the variable degree of slipperiness of the roadway on which the vehicle travels.

Yet another object of the invention resides in the provision of means associated with the switch contacts to close the same by the manual means, whenever desired, so as to actuate the blinking lights in any circumstances independently of the sudden deceleration of the vehicle.

The foregoing and other objects of the invention will become more apparent during the following disclosure by referring to the drawings, in which:

FIG. 6 is a section of a hydraulic delay system used as an alternative embodiment to the clock work system shown in the previous figures;

FIG. 7 is a partial section taken along line 7—7 of FIG. 6;

FIG. 9 is a bottom plan view of the piston.

In the drawings, like reference characters indicate like elements throughout.

Figure 1:
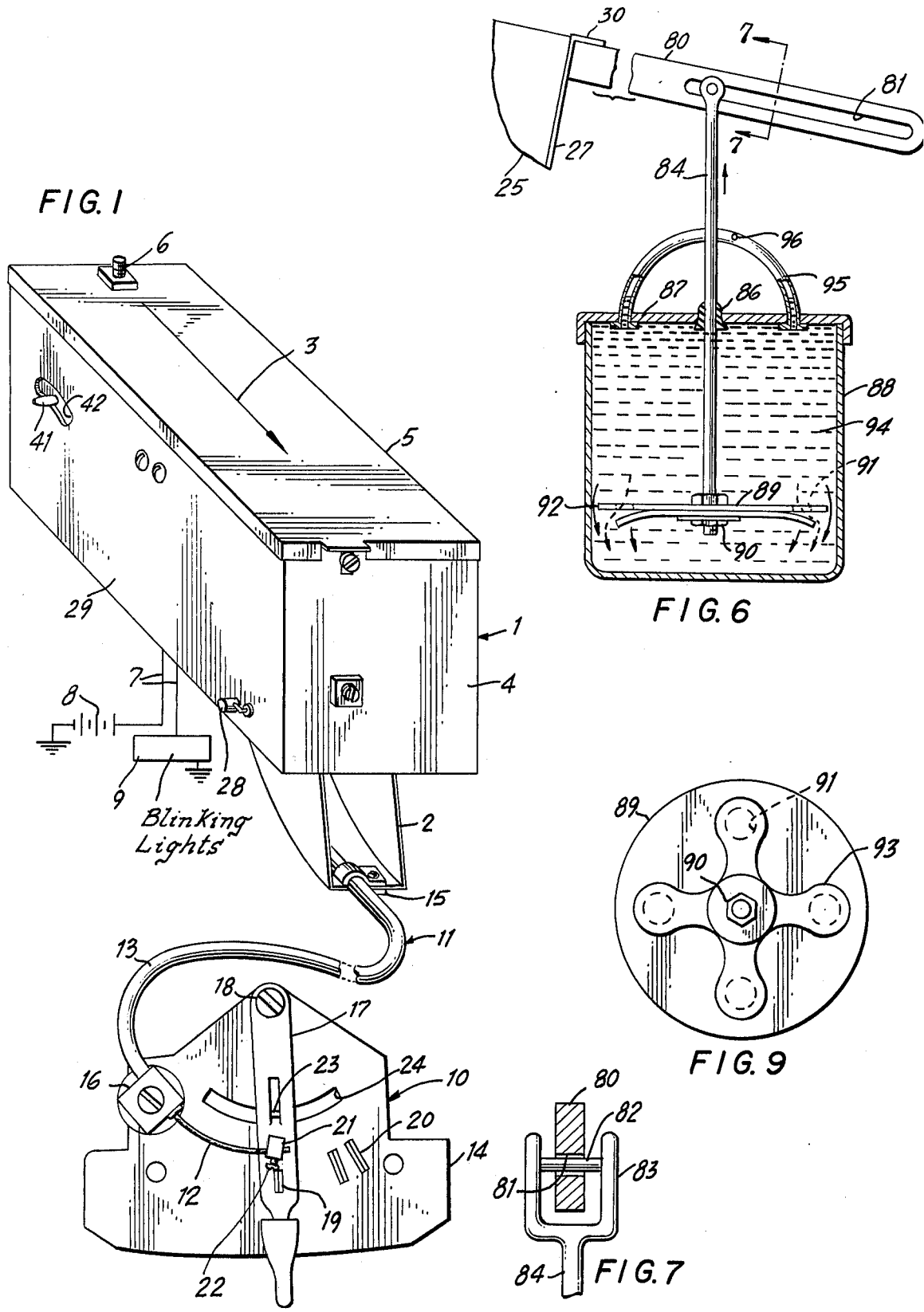
FIG. 1 is a perspective view of the box containing the inertia switch and time delay system in conjunction with a schematic electric diagram of the blinking lights and with a plan view of the manual control for the switch.

As shown in FIG. 1, a generally rectangular box 1 has at its underside a bracket 2 for securing the box to a stationary part of the vehicle, preferably in the engine compartment with the box preferably horizontally disposed within the vehicle and having its longitudinal axis parallel to the longitudinal axis of the vehicle with the box orientated in accordance with arrow 3 towards the front of the vehicle, the wall 4 being the front wall of the box. A cover 5 normally closes the box and is retained thereon by nut and screw means 6.

The box contains a switch and a time delay mechanism. The switch is connected by wires 7 to the car battery 8 and to a set of blinking lights 9, of any conventional construction, which are preferably mounted on each side of the back of the vehicle well above the usual stop lights and direction signalling lights, so as to be clearly visible to drivers of following vehicles. The circuit also includes indicating lights on the dashboard indicating whether or not the lights 9 are operative.

A manual control system, indicated at 10, is mounted in the passenger compartment, in a position readily accessible to the vehicle driver. The manual control is connected to the mechanism inside the box 1 by means of a flexible control cable 11, of conventional construction, and including the cable 12 longitudinally displaceable in a protective sheath 13 secured at both ends to the bracket 2 and to the support plate 14 of the manual control 10 by means of clamps 15 and 16, respectively.

A manual control lever 17 is pivoted at 18 on the support plate 14 and is movable along the plate 14. It is slightly resilient and has at its underface a boss forming a depression 19 at the top of said lever, selectively engageable with one or the other of depressions 20 made in the support plate 14, so as to determine different positions of the control lever.

The cable 12 is connected to the lever 17 by a block 21 and setscrew 22. A tongue 22, struck out from lever 17, engages an arcuate slot 24 of the support plate 14 to maintain the lever boss in engagement with anyone of the recesses 20.

Figure 2:
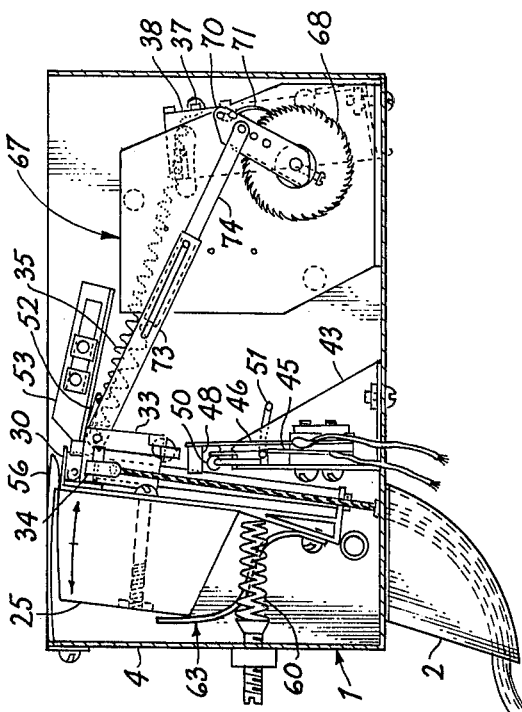
FIG. 2 is a longitudinal section of the switch box showing the inside elements with the switch in normal open position and the manual control lever set for travelling on a slippery surface, such as an ice-covered roadway.

Referring to FIG. 2, the inertia switch includes an inertia mass 25, preferably a block of lead or the like, weighing, for instance, about 1 pound and 6 ounces, which is secured by bolt and nut 26 to the upper end portion of a support lever 27, which is pivotally mounted at its lower end on a transversely extending pivot pin 28, mounted in the side walls 29 of box 1.

Figure 3:
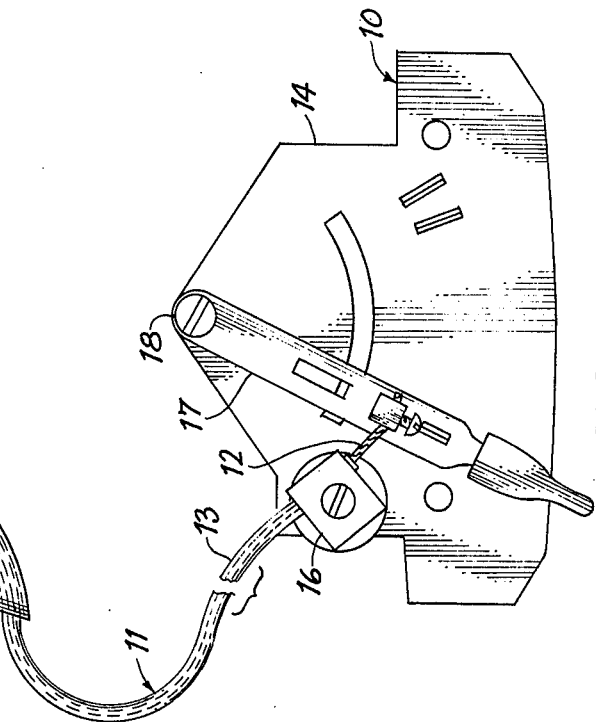
FIG. 3 is a view similar to that of FIG. 2 but with the switch in closed position (the inertia mass having moved forwardly) and with the manual control lever in a position set for travelling on a non-slippery surface, such as a dry paved highway.

The support lever 27 forms top and bottom rearwardly extending brackets 30 and 31 between which extends a guide rod 32 secured to said brackets and spaced from the support lever 27 and arranged in upright position. A slide block 33 is mounted on the guide rod 32 and is movable up and down said guide rod under the action of the control cable 12, which is secured thereto by means of the connection 34, as shown in FIG. 3.

A tension spring 35 is hooked to the slide block 33 at 36 at its front end, extends rearwardly of the box and is attached at its rear end at 37 to the upper portion of an adjusting lever 38 pivoted at its lower end by means of tongues 39 engaging holes in the bottom wall 40 of the box 1.

The upper end of the adjusting lever 38 has a tab 41 (see FIGS. 1 and 2) which projects through an elongated aperture 42 made in the side wall 29 of the box for manually adjusting the pivoted position of lever 38 and thus to adjust the tension of spring 35. Once adjusted, the lever 38 is locked in position by means of bolt and nut 43 engaging a bottom flange of said lever and extending through the bottom wall 40 of the box, as shown in FIG. 2.

Immediately adjacent the support lever 27, and at the back thereof, there is provided a support bracket 43 supporting the switch contacts. The support bracket 43 is secured to the bottom wall 40 by bolts and nuts 40a in longitudinally adjustable position. The bracket 43 carries insulating blocks 44 and an assembly of two electrical leaf spring contacts 45 and 46 sandwiched between the blocks 44, the assembly being secured to the front portion of the support bracket by bolts and nuts 47. The back contact spring 46 is longer than the front contact spring 45 and has a forwardly extending electric insulating abutment block 48 engageable with the inertia mass support lever 27 in the rearmost limit position of the same to move the back contact spring 46 rearwardly and open the switch contacts, as shown in FIG. 2.

When the support lever 27 moves forwardly from its back limit position, abutment block 48 is released and the back contact leaf spring 46 moves forward due to its resiliency and closes the switch, as shown in FIG. 3.

The support bracket 43 further carries a contact closing lever 49 in the form of a rod bent to form a closed rectangular frame pivoted on bracket 43 about a transverse axis parallel to the pivot pin 28 and having its top side carrying a roller 50, of insulating material, adapted to abut the front contact leaf spring 45. The lever 49 has a rearward extension 51 adapted to be pushed downwardly by the action of a finger 52 projecting rearwardly from the slide block 33 to thus cause clockwise pivoting of lever 49 which moves the front contact spring 45 rearwardly to close the contacts, despite the fact that the inertia mass 25 would be in a position to cause opening of these contacts.

Figure 5:
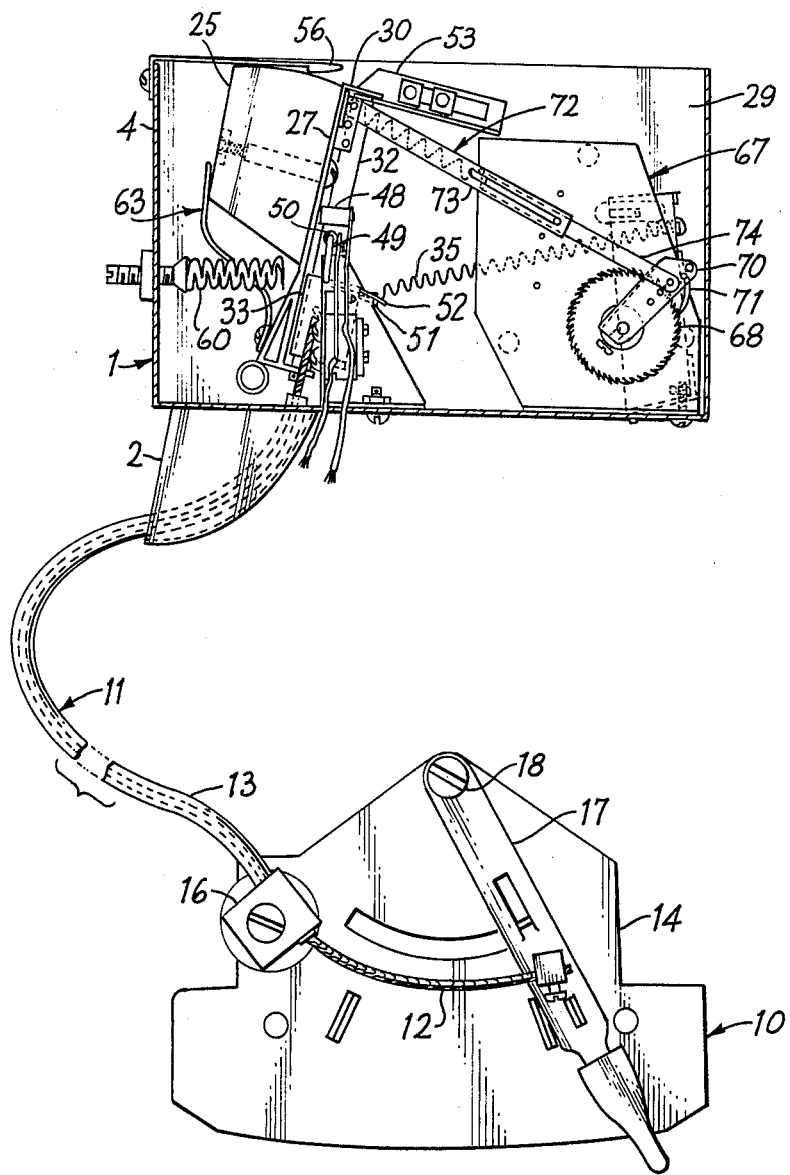
FIG. 5 is a view similar to FIGS. 2 and 3 but showing the inertia mass in normal position but with the switch being manually closed by the control lever to provide for emergency signalling whenever required independently of sudden deceleration of the vehicle.
Figure 8:
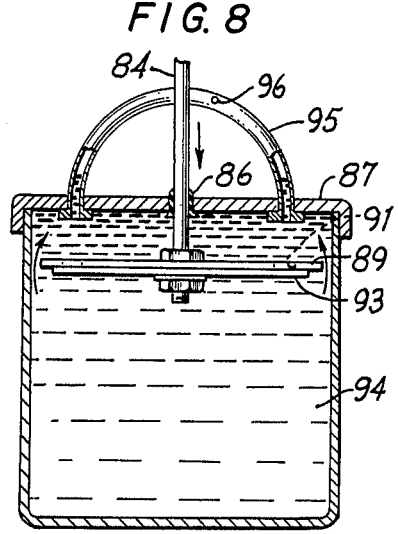
FIG. 8 is a view similar to FIG. 6 but with the piston at the top end of its course.

FIG. 5 shows such a position wherein the slide block 33 is in its lowermost limit position along guide rod 32 and its finger 52 engages the extension 51 of the lever 49, whereby roller 50 pushes against front leaf spring contact 45 to close the switch contacts, despite the fact that the inertia mass 25 is in its back limit position abutting abutment block 48, which would normally maintain the switch contacts in open position.

The back limit position of the inertia mass is defined by the upper end of the support lever 27 abutting against an adjustable stop 53 carried by the side wall 29 of the box and maintained in adjusted position by bolts and nuts 54 with the bolts engaging an elongated slot 55 of the adjustable stop 53.

The inertia mass 25 can be locked in foremost limit position by a leaf spring catch or hook 56 secured by bolt 57 to the top edge of the front wall 4 of the box 1 with the catch 56 riding on the top face of mass 25 and engageable with the back edge of the top flange 30, so as to allow backward pivoting of the inertia mass to its back limit position under the action of the tension spring 35.

A heavy compression coil spring 60 is disposed in the path of travel of the inertia mass support lever 27 to resiliently limit the forward movement of the inertia mass. The compression spring 60 is secured to the head of an adjustable screw 61 threaded in a nut 62 secured to the front wall 4 of box 1.

Furthermore, a leaf spring 63 is adjustably secured by screw 64 to the support lever 27, extends upwardly over the front face of the inertia mass 25 and is adapted to rest against the front lower corner 65 of said mass and extends upwardly spacedly from the front face of the mass, whereby, when the mass moves forwardly, the free top portion 66 of the leaf spring will abut the front wall 4 of the box and prevent latching of the mass by latch 56, except when there is sudden stopping due to a collision.

Deceleration of the vehicle in which the system is mounted at a rate beyond a certain minimum and below a certain maximum will cause forward movement of the inertia mass against the action of tension spring 35. As soon as deceleration ceases, the inertia mass starts to pivot rearwardly under the action of the tension spring 35. However, this backward pivoting movement of the inertia mass is retarded by a suitable time delay mechanism. The time delay mechanism is preferably a conventional clock work system of conventional construction and generally shown at 67, being mounted in the back portion of the box and secured thereto. The clock work mechanism 67 has an output ratchet wheel 68 mounted on a shaft 69 on which is also mounted for free pivoting movement an arm 70 carrying a spring-loaded pawl 71 engageable with the teeth of the ratchet wheel 68 to cause clockwise rotation of said ratchet wheel, the pawl releasing the teeth of the ratchet wheel when the arm 70 pivots in anticlockwise direction. The arm 70 is connected to the support lever 27 by means of a spring-loaded telescopic link 72 comprising a tubular arm 73 in which a rod-like arm 74 is telescopically inserted, there being a compression spring 75 within the tubular arm 73 abutting one end of the tubular arm and against the free end of the rod-like arm 74.

A stud 76 is carried by arm 74 and projects into a slot 77 of tubular arm 73 and defines the two limit positions of the telescopic link 72. The telescopic link 72, due to its shock-absorbing property, prevents breakage of the pawl 71 in the event of sudden rearward movement of the mass 25.

Link 72 can be adjustably connected to arm 70 and to support lever 27 by pivot pins insertable into selected ones of several holes 70' and 27' made in arm 70 and lever 27, respectively.

FIG. 6 shows another embodiment of a delay system. An arm 80 is rigidly secured to the top end of the inertia mass support lever 27 and extends rearwardly therefrom at substantially right angle thereto and is provided with an elongated slot 81 in which is longitudinally movable a clevis pin 82 carried by the forked upper end 83 of a piston rod 84, which extends through the seal 86 of a hole made in a cover 87 of a dash pot container, or cylinder 88, which is secured to the bottom wall of the box 1 in place of the clockwork mechanism 67, shown in the previous figures.

A disc-like piston 89 is secured to the lower end of the piston rod 84 by means of nuts 90 threaded on the lower end of the piston rod. The piston 89 has four through holes 91 near its periphery and also leaves a clearance 92 with the inside wall of container cylinder 88. A leaf spring valve 93 is secured to the piston rod underneath the piston disc and is stressed to close the holes 91. Upon forward movement of the inertia mass 25, the piston disc 89 moves upwardly and the oil 94 in the container 88 not only passes through the clearance 92, but also through the holes 91 exerting an opening force on the leaf spring valve 93. Thus, forward movement of the mass is not retarded. However, backward movement of the mass is retarded because the piston 89 moves down within the container and the oil causes the leaf spring valve 93 to close the holes 91, whereby the oil is only allowed to pass through the clearance 92.

The cover 87 carries a U-shaped tube 95 in communication at both ends with the inside of the container 88 to allow oil expansion when the outside temperature is too high, thereby eliminating any undue internal pressure within the container. Preferably, the tube 95 is provided with a top leakage hole 96.

The system of the invention operates as follows.

The inertia mass 25 is normally retained in its back limit position against adjustable stop 53 under the action of tension spring 35, thereby maintaining the switch contacts 45 and 46 in open position for all positions of the slide block 33 along guide rod 32, except a lowermost position of said side block wherein its finger 52 engages the lever 49 which closes the switch contacts, as shown in FIG. 5. Thus, whenever it is desired to actuate the blinking lights 9 for emergency warning along a roadway, the driver operates the lever 17 to the position shown in FIG. 5.

By pushing the lever to the position shown in FIG. 2, the slide block 33 is moved upwardly and the finger 52 releases the contact closing lever 49, whereby the switch contacts open, as shown in FIG. 2. This is a lever position used for driving on slippery surfaces, such as ice- or snow-covered roadways.

Figure 4:
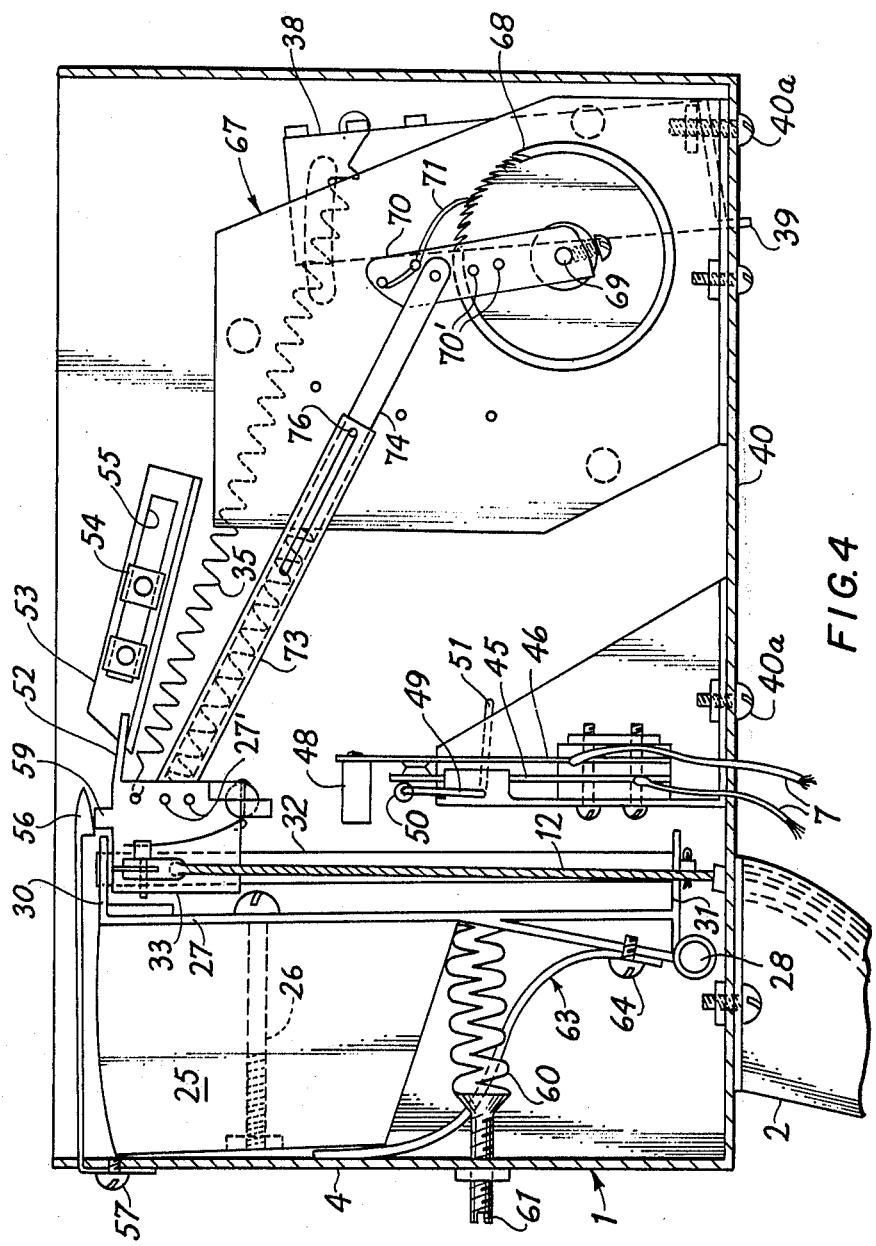
FIG. 4 is a view similar to that of FIGS. 2 and 3, but on an enlarged scale and without the control bar, showing the inertia mass in its forward limit position caused by a sudden stop, such as a collision, and with the inertia mass being manually released, the control lever (not shown) being in the mass releasing position.

The point of attachment of tension spring 35 to the assembly of the slide block 33 and inertia mass support lever 27 is close to the pivot pin 28 of the support lever 27, resulting in a small torque arm, whereby the inertia system is very sensitive. On slippery surfaces, it takes a longer time to brake the vehicle and, therefore, the deceleration rate is lower than on asphalt or cement or other dry roadway surfaces. Therefore, upon emergency braking, the inertia mass 25 moves forward until it abuts the compression spring 60. When deceleration at the above-mentioned rate is ceased, the tension spring 35 immediately tends to move the inertia back mass rearwardly, but the rearward movement of the inertia mass is delayed by the clockwork mechanism 67. The rearward push exerted by the link 72 causes the pawl 71 to drive the ratchet wheel 68 in clockwise direction, but this ratchet wheel only rotates at a slow speed due to the clockwork mechanism. The clockwork mechanism and the tension spring 35 are adjusted, for instance, to keep the switch contact in closed position for a time, say of about 40 to 60 seconds, after which the switch contacts automatically open, indicating to the following drivers that emergency braking has ceased to take place. In the event of a collision, the car suddenly stops, the inertia of the mass 25 is sufficient to cause the mass to move forwardly to a limit position overpowering leaf spring portion 66 and butting against the front wall 4 of the box. In this limit position, the latch 56 automatically engages the flange 30 of the inertia mass support lever 27 and latches the inertia mass in forward limit position, whereby the switch is kept closed and the blinking lights continue to operate, the delay system being then inoperative, until the operator manually moves the manual lever 17 to the foremost limit position past the position shown in FIG. 3, wherein the slide block 33 is moved to its upper limit position, as shown in FIG. 4, and its button 59 releases the leaf spring catch 56, whereby the inertia mass 25 moves back under the action of tension spring 35 but the opening movement of the switch contacts is delayed due to the action of the delay mechanism, which may be either the clockwork of FIGS. 1 to 5 or the hydraulic dash pot of FIG. 6. Thus, blinking lasts for an extra minute or so from the time the manual lever 17 has been moved to its latch releasing position.

As shown in FIG. 3, when the slide block 33 is near its upper limit position with the manual control lever in the position shown, the tension spring 35 acts on the inertia mass support lever with a much greater torque arm than in the position shown in FIG. 2. This position of the control arm and slide block is adapted for travelling on dry, non-slippery roads where the deceleration rate, upon emergency braking, is rather high, resulting in greater forward force applied to the inertia mass than when the vehicle travels on a slippery surface. This greater forward force is resisted by the greater pull exerted by the tension spring 35, so that, in practice, the inertia mass attains substantially the same forward limit position as in the case of FIG. 2, whereby the blinking lights are actuated for about the same time in both cases.

Compression spring 60, which is adjustable, serves in conjunction with the position of the slide block and, therefore, in conjunction with the variation of the pull exerted by the tension spring 35 to stop the forward movement of the inertia mass to substantially the same position despite variation in the degree of slipperiness of the roadway, so as to obtain substantially uniform emergency signalling time by the blinking lights.

The leaf spring 63 is adjustably mounted on the lever 27 so as to increase or decrease the length of the overlying portion 66 of the spring 63. This overlying portion 66 is adjusted so as to allow latching of the inertia mass into its forward limit position only when the vehicle enters into collision. Strong braking action will not cause the latch to engage. If the leaf spring 63 was absent, it would be necessary to have a very strong tension spring 35 to prevent latching of the inertia mass upon emergency braking, and this would result in lack of sensitivity of the system.

The system of the invention gives also a substantially constant time warning, whether the vehicle is climbing a hill or going downhill when emergency braking is applied. When going uphill, the vehicle, naturally, decelerates faster than going downhill for a given braking action; but the inertia mass will move forwardly with respect to the box to a lesser extent than when going downhill where braking takes more time. Therefore, in practice, the inertia mass moves forwardly with respect to the box to substantially the same extent, whether braking when going uphill or downhill, thereby resulting in substantially constant duration of the blinking action.

We claim:

1. A vehicle automatic emergency signalling system comprising, in combination, an electrical circuit independent of the other vehicle circuits and including emergency signalling lights adapted to be mounted on a vehicle, a normally open inertia switch adapted to be mounted on the vehicle and series-connected to the signalling lights to close the circuit to the same only when deceleration of the vehicle occurs above a minimum, a time delay system associated with said inertia switch to delay the opening of said switch after the latter has closed upon rapid deceleration of the vehicle in which the system is mounted, a container housing said inertia switch and said time delay system, said container adapted to be secured to a vehicle, said inertia switch including an upstanding support lever pivotally mounted within said container at its lower end, an inertia mass fixed to the upper end of said support lever for causing pivoting of the same in a given direction upon deceleration of the vehicle, switch contact means mounted in said container adjacent said support lever and engageable by said support lever in a rest position of the latter to open the contacts of said switch contact means, said support lever, when pivoting away from said rest position, allowing closing of said contact means, spring means urging said support lever towards said rest position, said time delay system including a link connected to said support lever at one end and means mounted in said container connected to the other end of said link and restraining the movement of said link under the action of said spring means.

2. A system as claimed in claim 1, further including a latch means carried by said container and engageable with said support lever in a pivoted limit position away from said rest position, and externally mounted manual control means operatively associated with said latch means to release the same from said support lever to allow the latter to return to its rest limit position.

3. A system as claimed in claim 2, further including a guide rod carried by said support lever, a slide block mounted on said guide rod for movement therealong, said manual control means connected to said slide block for moving the same along said guide rod, said slide block engageable with said latch means in a limit position thereof to release the same.

4. A system as claimed in claim 3, wherein said guide rod extends substantially perpendicular to the pivot axis of said support lever and said slide block is movable along said guide rod to take positions at different distances from said pivot axis, said tension spring means connected to said slide block whereby adjusting the position of said slide block along said guide rod will vary the pull exerted by said tension spring means on said support lever.

5. A system as claimed in claim 4, further including means on said slide block engageable with said switch contact means in a second limit position of said slide block away from said first-named limit position and in the rest limit position of said support lever to close said switch contacts, even if said support lever in said rest position tends to open said switch contacts.

6. A system as claimed in claim 5, wherein said switch contact means include a pair of leaf springs carrying switch contacts, an abutment block carried by one of said leaf springs and engageable with said support lever in the rest position of the latter to open the switch contacts, bracket means for supporting said leaf springs, a lever pivotally mounted on said bracket means and engageable with the other one of said leaf springs to move the latter to contact closing position, even if the abutment block is engaged by said support lever, a finger carried by said slide block and an extension carried by said lever and engageable by said finger in the second limit postiion of said slide block.

7. A system as claimed in claim 6, further including adjustable spring means interposed between said container and the assembly of said support lever and said inertia mass to resiliently stop movement of said assembly to a position away from said rest limit position but short of engagement with said latch means for a predetermined maximum pivoting speed of said assembly away from said rest limit position and allowing further pivoting movement of said assembly to a limit position in which said latch means engages with said support lever for pivoting speeds of said assembly above said maximum.

8. A system as claimed in claim 7, wherein said manual control means include a support plate adapted to be mounted in a vehicle in a position accessible to the driver of the vehicle, a manual control lever pivotally mounted on said support plate and a flexible control cable connected to said manual control lever and to said slide block, whereby movement of said control lever, along said support plate, will cause movement of said block along said guide rod.

9. A system as claimed in claim 1, wherein said time delay system includes a clockwork mechanism having an output shaft, a ratchet wheel secured on said output shaft, the rotational movement of said ratchet wheel being kept at a slow speed by said clockwork mechanism, an arm pivotally mounted on said output shaft, a spring-loaded pawl pivotally carried by said arm and engageable with the teeth of said ratchet wheel, said link being pivotally connected to said arm.

10. A system as claimed in claim 9, wherein said link is a spring-loaded telescopic link forming shock absorbing means to prevent breakage of said pawl upon sudden movement of said support lever towards its rest limit position.

11. A system as claimed in claim 10, wherein said spring-loaded telescopic link is adjustably pivotally connected to said support lever and to said arm.

12. A system as claimed in claim 11, further including a bracket pivotally mounted within said container ajustable clamping means to clamp said bracket in adjusted pivoted position, said tension spring means attached to said bracket whereby the adjusted position of the latter adjusts the tension of said tension spring means.

13. A system as claimed in claim 1, wherein said time delay system includes a hydraulic dash pot mounted in said container and having a movable piston rod, said link being rigidly secured to said support lever, said piston rod having a lost motion connection with said link, whereby pivoting movement of said support lever and link causes displacement of said piston rod, said dash pot retarding the displacement of said piston rod during movement of said support lever towards its rest limit position and allowing free movement of said support lever away from said rest limit position.

* * * * *